Aug. 23, 1966
A. L. NOVAK
3,268,790
BACK E.M.F. RESPONSIVE MOTOR SPEED CONTROL CIRCUIT
Filed June 7, 1963
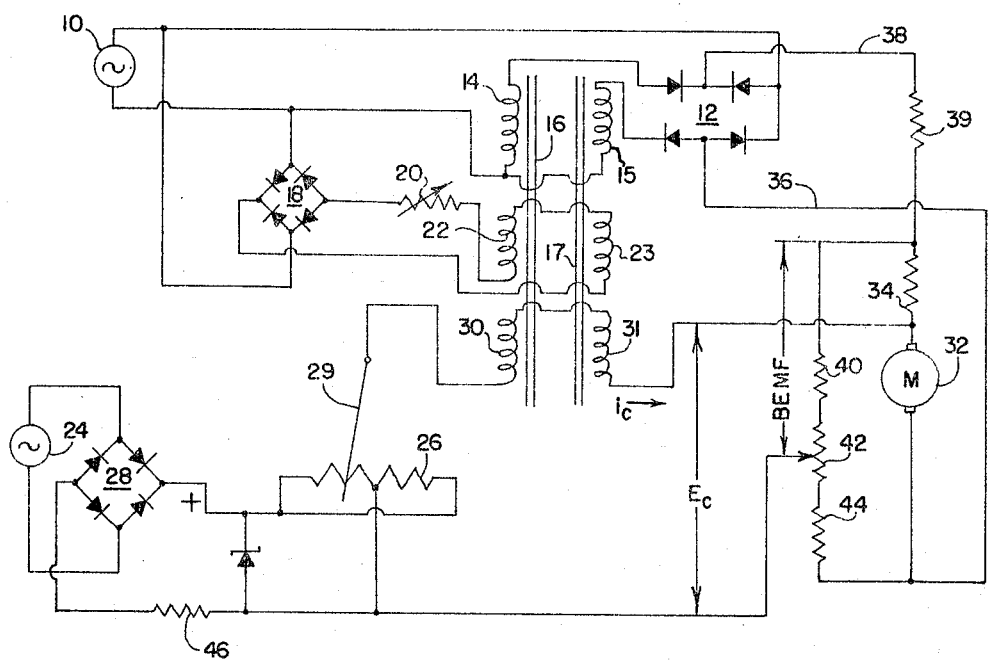
INVENTOR.
ANTHONY L. NOVAK
BY *Kenneth D. Ohm*
ATTORNEY United States Patent Office 3,268,790
Patented August 23, 1966

3,268,790
BACK E.M.F. RESPONSIVE MOTOR SPEED
CONTROL CIRCUIT
Anthony L. Novak, Minneapolis, Minn., assignor to General Mills, Inc., a corporation of Delaware
Filed June 7, 1963, Ser. No. 286,272
1 Claim. (Cl. 318—331)

This invention relates to motor speed control circuits. More particularly, it pertains to a motor speed control circuit for regulating the voltage applied to a motor armature by means of a feedback circuit including a fixed predetermined resistance selected so the current through the control winding which regulates said voltage will not exceed the maximum rating of said control winding and connected so the current through said resistance will not cause a voltage drop between the control winding and the motor armature.

One object of the present invention is to provide a simplified control circuit for maintaining a relatively constant motor speed.

Another object of the present invention is to provide a speed control circuit for maintaining a motor at relatively constant speed under changing load conditions by regulating the voltage across the motor armature, which voltage changes with changing loads for any preset speed, in which the voltage applied across the armature is controlled by means of an armature reference circuit that is connected in shunt with said armature.

A further object of the present invention is to provide a motor armature reference circuit in such a manner that the current limiting resistor of the control circuit will not change the preset control voltage when the motor load changes.

Other objects and advantages of the invention will be apparent from the following description in which a preferred embodiment of the invention is disclosed.

In the figure which forms a part of this application, a source of alternating current 10 is indicated as supplying current through a rectifier circuit 12 to a first output winding 14 and a second output winding 15. The first output winding 14 is wound around a first reactor 16, while the second output winding 15 is wound around a second reactor 17. As used herein, a reactor is a saturable core in which the degree of saturation of the core material may be independently controlled. The source of alternating current 10 also supplies current through a rectifier circuit 18 and a variable resistance 20 to a first bias winding 22 and a second bias winding 23. The first bias winding 22 is wound around the reactor 16, while the second bias winding 23 is wound around the reactor 17.

A second source of alternating current 24 is indicated as supplying current to a center tapped potentiometer 26 through a rectifier circuit 28. A wiper arm 29 (which is movable along the resistance of the potentiometer 26) is connected to one end of a first control winding 30 which is wound around the reactor 16. The other end of the first control winding 30 is connected in series with a second control winding 31 which is wound around the second reactor 17. The resistance of windings 30 and 31 is very low so that any voltage drop thereacross will be negligible. The other end of the control winding 31 is connected to one end of the armature of a direct current motor 32. The end of the armature which is connected to the control winding 31 is connected in series with a resistance 34. The armature of the motor 32 and the series connected resistance 34 are connected to the rectifier 12 through connector 36 and 38 which have some resistance indicated by numeral 39.

In parallel with the resistor 34 and the armature of the motor 32 is a reference circuit including series connected resistors 40, 42, and 44. A movable contact on the resistor 42 is connected to the rectifier circuit 28 through a resistor 46.

In operation, the source of alternating current 10 tends to establish a direct current voltage across the connectors 36 and 38 through the rectifier circuit 12. This voltage is effected by the degree of saturation in the reactors 16 and 17 as well as the maximum magnitude of the source of alternating current 10 then being impressed on the rectifier circuit 12. The greater the amount of saturation of the reactor 16 or 17 the greater (up to a given maximum value) will be the direct current voltage established between the connectors 36 and 38 for a given maximum value of alternating current supplied by the source 10. Since the currents through windings 14 and 15 flow only in one direction, the reactors 16 and 17 tend to be self-saturating.

The saturation of the reactors 16 and 17 is effectively reduced by the bias windings 22 and 23 to a preset minimum output as is well known in the art. These bias windings 22 and 23 are arranged so the saturation caused therein through the rectifier circuit 18 acts in opposition to that of the output windings 14 and 15. This reduces the voltage established between the connectors 36 and 38.

The saturation of the reactors 16 and 17 by their respective output windings 14 and 15 and their bias windings 22 and 23, respectively, is effectively added to by the control windings 30 and 31, respectively. That is, the saturation caused by the control windings 30 and 31 acts cumulatively with the saturation caused by the output windings 14 and 15, respectively. The function of these control windings is to control the degree of saturation of their respective reactors and thereby control the voltage delivered by the rectifier circuit 12 to the armature of the motor 32.

The reference circuit including resistors 40, 42, and 44 feeds back a signal to the control windings 30 and 31 which signal changes the voltage between the connectors 36 and 38 in such a manner to maintain the motor 32 at a relatively constant speed. The value of the resistor 40 is fixed. It is selected so the current through the control windings 30 and 31 will not exceed the maximum rating of said control windings. That is, the value of the resistance 40 is a predetermined fixed value selected so the current flowing through the circuit comprising the control windings 30 and 31, the resistor 34, the resistor 40, the portion of the resistor 42 which is between its adjustable contact and the resistor 40, and the portion of the resistance of the potentiometer between its center tap and the wiper arm 29 will be kept below the maximum rating of the control windings. By connecting the resistor 40 in the circuit as shown in the figure, the resistor 40 remains in series with the control windings 30 and 31 but in such a manner so as not to cause a voltage drop between said control windings and the junction between the armature of the motor 32 and the resistor 34.

This is accomplished by placing resistor 40 in the net BEMF (back electromotive force) circuit instead of in the preset control circuit, since it is desired that the preset control voltage $E_c$ remain constant under varying conditions of current flow, $i_c$, through the control windings ($i_c$ varies when the motor load changes because the net BEMF changes). The net BEMF is equal to the BEMF of the motor minus the current flowing into the motor armature times the resistance of the resistor 34. Therefore, when larger current flows in the motor armature the net BEMF is less and more current flows in the control windings 30 and 31 which reduces the impedance of the reactors 16 and 17 which drives the voltage between the connectors 36 and 38 higher. It can be seen that with varying control current, $i_c$, flowing, $E_c$ would not be constant if a resistor like 40 was inserted in the preset control circuit. The difference would be [$I_h$ (high load current) $-I_1$ (low load current)] times resistance 34 volts.

In view of the principles set forth herein, I have shown and described some of the ways of carrying out the present invention and some of the equivalents which are suggested by these disclosures.

What is claimed is:

A magnetic amplifier motor speed control system comprising a reactor, an output winding on said reactor adapted to increase the degree of saturation of said reactor, a bias winding on said reactor adapted to act in opposition to said output winding to decrease the degree of saturation of said reactor, a control winding on said reactor adapted to act cumulatively with said output winding to increase the degree of saturation of said reactor, means for providing a supply voltage connected in series with said output winding, a motor having an armature, a current limiting resistor in series with said armature, said series connected armature and said limiting resistor connected across the output of said supply voltage means, a predetermined fixed resistance shunting said series connected armature and limiting resistor, means for supplying a preset voltage to said control winding connected in series with said control winding, one end of said series connected control winding and means for supplying a preset voltage being connected to the junction of said armature and said current limiting resistor and the other end thereof being connected to the end of said predetermined fixed resistance which is free of direct connection to said current limiting resistor, the value of said predetermined fixed resistance being selected so the current through the control winding will always be less than the maximum rating of said control winding.

References Cited by the Examiner
UNITED STATES PATENTS

| | | | |
|---|---|---|---|
| 2,721,968 | 10/1955 | Brown | 318—331 X |
| 2,769,130 | 10/1956 | Few | 318—331 |
| 2,864,989 | 12/1958 | Bradburn et al. | 318—331 |

ORIS L. RADER, *Primary Examiner.*

S. GORDON, J. C. BERENZWEIG, *Assistant Examiners.*